US 6,393,834 B1

(12) United States Patent
Takaoka et al.

(10) Patent No.: US 6,393,834 B1
(45) Date of Patent: May 28, 2002

(54) EXHAUST PURIFYING APPARATUS FOR INTERNAL COMBUSTION ENGINE

(75) Inventors: Nobuaki Takaoka; Hiroshi Oono, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/570,413

(22) Filed: May 12, 2000

(30) Foreign Application Priority Data

May 21, 1999 (JP) .......................................... 11-142475

(51) Int. Cl.$^7$ ................................................ F01N 3/00
(52) U.S. Cl. ............................ 60/295; 60/285; 60/286; 60/300; 60/301
(58) Field of Search ...................... 60/277, 285, 286, 60/295, 300, 301

(56) References Cited

U.S. PATENT DOCUMENTS

| 5,402,641 A | * | 4/1995 | Katoh et al. ................... 60/285 |
| 5,577,382 A | * | 11/1996 | Kihara et al. .................. 60/277 |
| 5,974,791 A | * | 11/1999 | Hirota et al. .................. 60/286 |
| 6,105,365 A | * | 8/2000 | Deeba et al. .................. 60/295 |
| 6,125,629 A | * | 10/2000 | Patchett ....................... 60/286 |
| 6,128,899 A | * | 10/2000 | Oono et al. ................... 60/295 |
| 6,161,378 A | * | 12/2000 | Hanaoka et al. ............... 60/286 |
| 6,164,064 A | * | 12/2000 | Pott ............................. 60/286 |
| 6,192,675 B1 | * | 2/2001 | Hirota et al. .................. 60/286 |
| 6,199,372 B1 | * | 3/2001 | Wakamoto .................... 60/277 |
| 6,244,046 B1 | * | 6/2001 | Yamashita .................... 60/277 |

* cited by examiner

Primary Examiner—Thomas Denion
Assistant Examiner—Diem Tran
(74) Attorney, Agent, or Firm—Arent Fox Kintner Plotkin & Kahn, PLLC

(57) ABSTRACT

In order to prevent degradation of an operational mode and a fuel consumption of an internal combustion engine at the time when raising the temperature of a catalyst poisoned NOx absorbent for removing the accumulated sulfur compounds, an exhaust purifying apparatus is provided in an exhaust pipe 22 connected to an internal combustion engine 11. The exhaust purifying apparatus comprises an air-fuel ratio controlling device for controlling the air-fuel ratio, and a fuel feeder for feeding fuel upstream of said nitrogen oxide absorbent; a temperature raising device for raising the temperature of the nitrogen oxide absorbent by feeding fuel by means of said fuel feeder, when the absorbing capability of the nitrogen oxide absorbent is catalyst poisoned by the accumulated sulfur compounds; and a restoring device for restoring the nitrogen oxide absorbing capability of said nitrogen oxide absorbent by controlling the air-fuel ratio so as to be made richer than the stoichiometric air-fuel ratio by said air-fuel ratio controlling device.

2 Claims, 3 Drawing Sheets

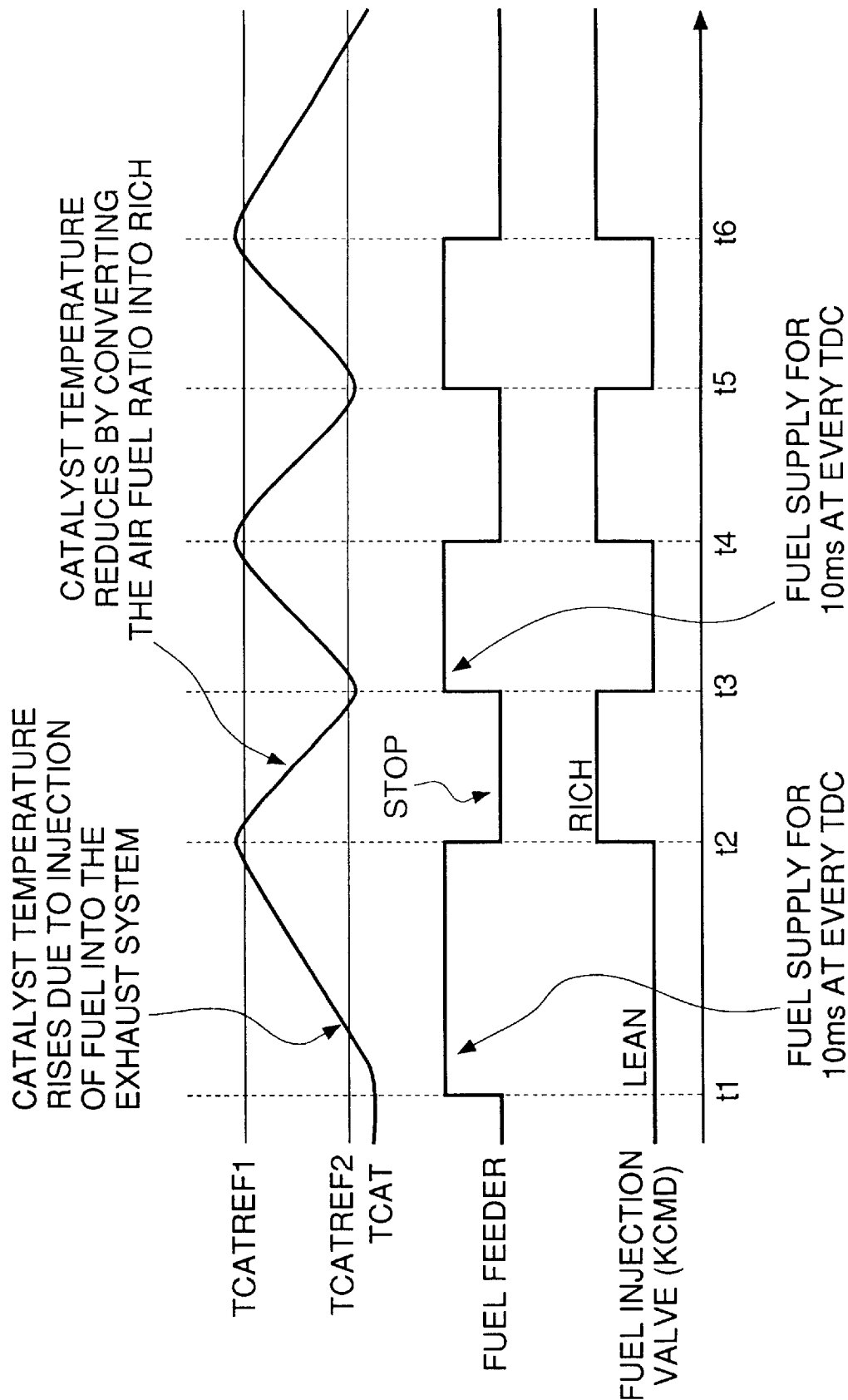

EXHAUST PURIFYING APPARATUS FOR INTERNAL COMBUSTION ENGINE

BACKGROUND OF THE INVENTION

1. Field of the Invention

The present invention relates to an exhaust purifying apparatus for an internal combustion engine, and especially relates to an exhaust purifying apparatus for an internal combustion engine for purifying the exhaust gas by reducing the nitrogen oxides in the exhaust gas.

2. Background Art

Conventionally, it has been known that, when the air-fuel ratio of the mixture supplied to the internal combustion engine is made leaner than the normal mixture (with a stoichiometric ratio) and so-called lean-burn is executed, the output of nitrogen oxides increases. Thus, a conventional technique has been adopted to carry out the purification of the exhaust gas by providing in the exhaust system an exhaust gas purifying apparatus, which includes NOx absorbents for removing NOx by absorbing or adsorbing NOx from the exhaust gas.

The NOx absorbent absorbs or reduces NOx depending upon the oxygen concentration of the exhaust gas. When the air-fuel ratio of the mixture is made leaner than the normal air-fuel ratio and the oxygen concentration in the exhaust gas is high, the NOx absorbent absorbs NOx. In contrast, when the air-fuel ratio is made richer than normal air fuel ratio and the oxygen concentration is relatively low and the concentrations of hydrocarbons or carbon monoxide is high, the NOx absorbent purifies the exhaust gas by reduction of NOx and exhausts nitrogen gas.

On the other hand, the fuel or the lubricant for the internal combustion engine often contains sulfur, so that sulfur compounds such as sulfur oxide are contained in the exhaust gas. The above NOx absorbent absorbs sulfur compounds in addition to NOx in the exhaust gas. The sulfur compounds absorbed in the NOx absorbent are more likely to be accumulated than NOx, so that, as accumulated sulfur compounds increases, absorption of NOx to the NOx absorbent is disrupted and the purification efficiency is reduced as the accumulated sulfur compounds increase, which causes degradation of the NOx absorbent by so-called catalyst poisoning.

When such poisoning of the NOx absorbent occurs, a conventional method is known to restore the NOx absorbent by removing the sulfur compounds absorbed in the NOx absorbent by suitably heating the NOx absorbent and maintaining the NOx absorbent for a suitable time in a condition in which the air-fuel ratio is richer than the stoichiometric air-fuel ratio. Japanese Patent Application, First Publication No. Hei 7-186785 discloses a control device for controlling the temperature of the NOx absorbent provided in an internal combustion engine. The above control device controls the temperature of the exhaust gas by controlling a gear position of the transmission connected to the internal combustion engine.

According to the above document, the NOx absorbent used in the exhaust purifying apparatus of an internal combustion engine absorbs sulfur compounds as follows when an air-fuel ratio of the mixture is made lean. That is, the sulfur compounds in the exhaust, for example, $SO_2$, is oxidized on the platinum catalyst Pt into sulfate ions such as $SO_3^-$ or $SO_4^-$, and $BaSO_4$ is formed by bonding with BaO contained in the NOx absorbent. When the amount of the sulfur compounds absorbed in the NOx absorbent exceeds a predetermined value, the gear position of the transmission is automatically set to a low speed position and the air-fuel ratio is made rich.

That is, change of the rotation of the internal combustion engine to a low speed raises the exhaust temperature, and the temperature of the NOx absorbent reaches around 600° C. Thereby, $BaSO_4$ formed in the NOx absorbent is decomposed by high temperature to generate $SO_3^-$ or $SO_4^-$. As the oxygen content in the exhaust is reduced, sulfate ions such as $SO_3^-$ or $SO_4^-$ contained in the NOx absorbent are reduced and released from the NOx absorbent due to the increased content of the unburned gas containing hydrocarbons or carbon monoxide. Accordingly, the sulfur compounds absorbed in the NOx absorbent are reduced and released.

The above conventional control device of the internal combustion engine controls the temperature of the NOx absorbent by raising the temperature of the NOx absorbent in the exhaust purifying apparatus. However, a problem arises that since the temperature of the NOx absorbent is raised by setting the gear position of the transmission to a low speed, the fuel consumption and the mode of driving operation are degraded.

SUMMARY OF THE INVENTION

It is therefore an objective of the present invention to provide an exhaust purifying apparatus capable of efficiently avoiding degrading the fuel consumption and maintaining the mode of the driving operation when removing the accumulated sulfur compounds by raising the temperature of the NOx absorbent at high temperature.

An exhaust purifying apparatus, provided in an exhaust system of an internal combustion engine and provided with a nitrogen oxides absorbent, which absorbs nitrogen oxides when the air-fuel ratio of mixture is made leaner than the stoichiometric air-fuel ratio, and reduces nitrogen oxides when the air-fuel ratio is made richer than the stoichiometric air-fuel ratio, comprising: an air fuel ratio controlling device (described later in the embodiment as a fuel injection valve 16) for controlling the air-fuel ratio of said internal combustion engine, and a fuel feeding device (described later in the embodiment as a fuel feeder 29) for feeding fuel to an upstream side of said nitrogen oxide absorbent; a temperature raising device for raising the temperature of the nitrogen oxide absorbent by feeding fuel by means of said fuel feeder, when the absorbing capability of the nitrogen oxide absorbent is catalyst poisoned by the accumulated sulfur compounds; and a restoring device (described later as ECU 15) for restoring the nitrogen oxide absorbing capability of said nitrogen oxide absorbent by controlling the air-fuel ratio so as to become richer than the stoichiometric air-fuel ratio by said air-fuel ratio controlling device.

According to the exhaust purifying apparatus of an internal combustion engine having the above described structure, at the time of raising the temperature of the nitrogen oxide absorbent, the temperature of the nitrogen oxide absorbent is raised by simply supplying fuel by the fuel supplying device disposed in upstream of the nitrogen oxide absorbent, which results in preventing the degradation of the fuel consumption, in contrast to the conventional method of heating the nitrogen oxide absorbent by increasing the rotation of the internal combustion engine.

In addition, since the present apparatus does not require any auxiliary heating devices such as heaters or burners for heating the nitrogen oxides absorbent, the present apparatus can be simple and can reduce the manufacturing cost.

BRIEF DESCRIPTION OF THE DRAWINGS

FIG. 3 is a timing chart showing an operation of the exhaust purification of the internal combustion engine illustrated in FIG. 1.

DETAILED DESCRIPTION OF THE INVENTION

Figure 1:
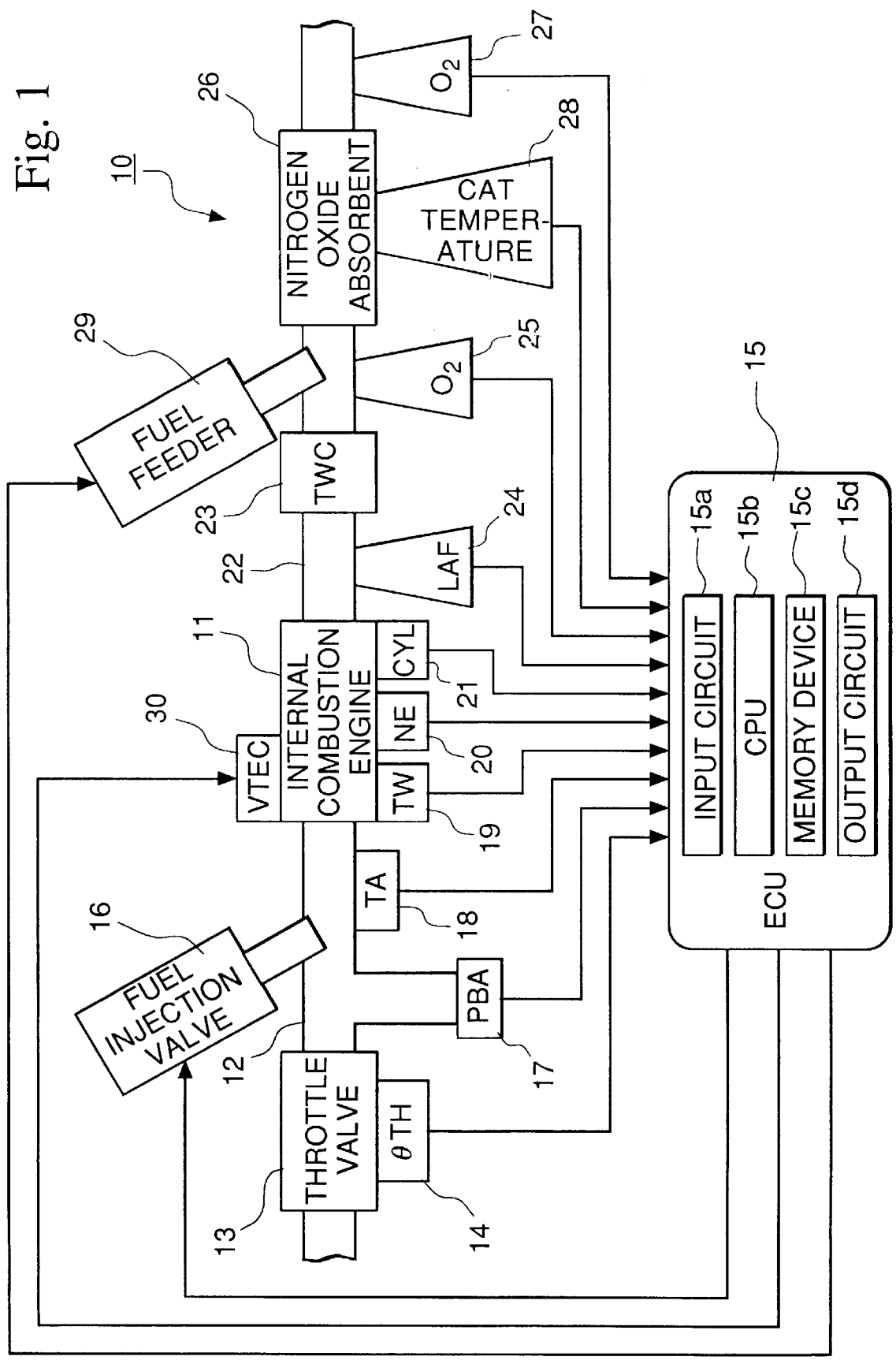
FIG. 1 is a diagram showing the structure of an exhaust purifying apparatus of an internal combustion engine according to one embodiment of the present invention.

Hereinafter, one embodiment of the present invention is described with reference to the attached drawings. FIG. 1 is a diagram showing the structure of an exhaust purifying apparatus of an internal combustion engine according to the embodiment of the present invention.

First, an explanation is given concerning the air-fuel ratio control device provided in the exhaust purifying apparatus 10 of an internal combustion engine according to the embodiment of the present invention. The air-fuel ratio control device comprises a throttle valve 13 in the middle of an intake pipe 12 of the internal combustion engine composed of an multiple cylinder engine or the like. A valve opening sensor 14 (θTH) is connected to the throttle valve 13, the θTH sensor 14 outputs an electric signal corresponding to the opening of the throttle valve 13, and the electronic sensor is transmitted to the electronic control unit (ECU) 15.

In addition, a fuel injection valve 16 is disposed between the internal combustion engine 11 and the throttle valve 13 and the fuel injection valve 16 is connected with a fuel pump (not shown) and electrically connected with ECU 15, which output an electric signal for controlling the fuel injection time, that is, the opening period of the fuel injection valve 16.

An intake pipe internal absolute pressure (PBA) sensor 17 is provided downstream of the throttle valve 13 in the intake pipe 12 and the internal absolute pressure in the intake pipe 12 is transmitted to ECU 15 after being converted into an electric signal by this PBA sensor 17. Furthermore, an intake gas temperature (TA) sensor 18 is provided in the downstream of the PBA sensor 17 and the electric signal corresponding to the intake gas temperature is transmitted to ECU 15.

Next, the exhaust purifying apparatus 10 of the internal combustion engine 11 according to this embodiment of the present invention will be described. The exhaust purifying apparatus 10 comprises ECU 15, an exhaust pipe 22, a LAF sensor 24, a first $O_2$ sensor 25, a nitrogen oxides absorbent 26, a second $O_2$ sensor, a CAT sensor, and a fuel feeder 29.

The exhaust pipe 22 is connected to each cylinder of the internal combustion engine 11 and forms an exhaust pipe assembly. A catalyst, for example, a three way catalyst (TWC), for purifying hydrocarbons, carbon monoxide and NOx is provided in the exhaust pipe 22. A proportional air-fuel ratio (LAF) sensor 24 corresponding to an proportional oxygen concentration' detector is disposed near the TWC 23, that is, between the internal combustion engine 11 and the TWC 23 and, downstream of the TWC 23, the first $O_2$ sensor 25 is disposed. The LAF sensor 24 outputs and supplies an electric signal approximately proportional to the oxygen concentration in the exhaust gas to ECU 15. The first $O_2$ sensor 25 has an output characteristic, which changes in the vicinity of the stoichiometric air-fuel ratio. For example, the first $O_2$ sensor 25 outputs and supplies a high level electric signal to ECU 15 when the air-fuel ratio is made richer than the stoichiometric ratio, and a low level electric signal is output when the air-fuel ratio is made leaner than the stoichiometric ratio.

Downstream of the first $O_2$ sensor, a nitrogen oxides (NOx) absorbent 26 is provided for chemically reducing and purifying the exhaust gas of NOx. Further down stream of the NOx absorbent 26, a second $O_2$ sensor 27 is disposed in order to measure the oxygen concentration in the exhaust gas and to supply the corresponding electric signal to ECU 15.

The NOx absorbent comprises a catalyst constituted by, for example, platinum Pt, and absorbs NOx in the exhaust gas when the air fuel ratio of the mixture is made leaner than the stoichiometric air-fuel ratio. Here, the term "absorb" indicates either the state that the NOx is absorbed (and diffused) after conversion into nitrate ions or that NOx is chemically adsorbed on the surface of the catalyst.

When the oxygen concentration in the exhaust gas is reduced by making the air-fuel ratio richer than the stoichiometric ratio, NOx gas absorbed in the catalyst is discharged as nitrogen gas after being chemically reduced by unburned components such as hydrocarbons or carbon monoxide. In addition, a CAT temperature sensor 28 is provided in the NOx absorbent for measuring the temperature of the catalyst (CAT), and the output electric signal from the CAT temperature sensor 28 is transmitted to ECU 15.

A fuel feeder 29 is disposed between the three way catalyst 23 and the NOx absorbent 26 connected to the fuel pump (not shown) and the feeding rate and the feeding time are controlled by the electric signal from the ECU 15 to the fuel feeder 29. Here, the fuel supplied to the exhaust pipe 22 raises the temperature of the NOx absorbent 26 by being burned in the NOx absorbent.

The internal combustion engine 11 comprises a valve timing mechanism (VTEC) 30, which is used for switching the driving condition of the internal combustion engine, that is, for controlling the timing of opening or closing the intake valves or the exhaust valves.

ECU 15 comprises an input circuit 15a, a CPU 15b, a memory device 15c for storing various computing programs and computation results executed or determined by the CPU 15b, and an output circuit 15b for outputting driving signals to the fuel injection valves 16 and fuel feeder 29, respectively.

The CPU 15b detects the degree of degradation of the NOx sensor 26 based on the input signals of the respective sensors and controls the fuel feeding time or the fuel feeding rate of the fuel injection valve 16 or the fuel feeder 29 in synchronism with the TDC signal pulse output from, for example, the NE sensor 20.

Figure 2:
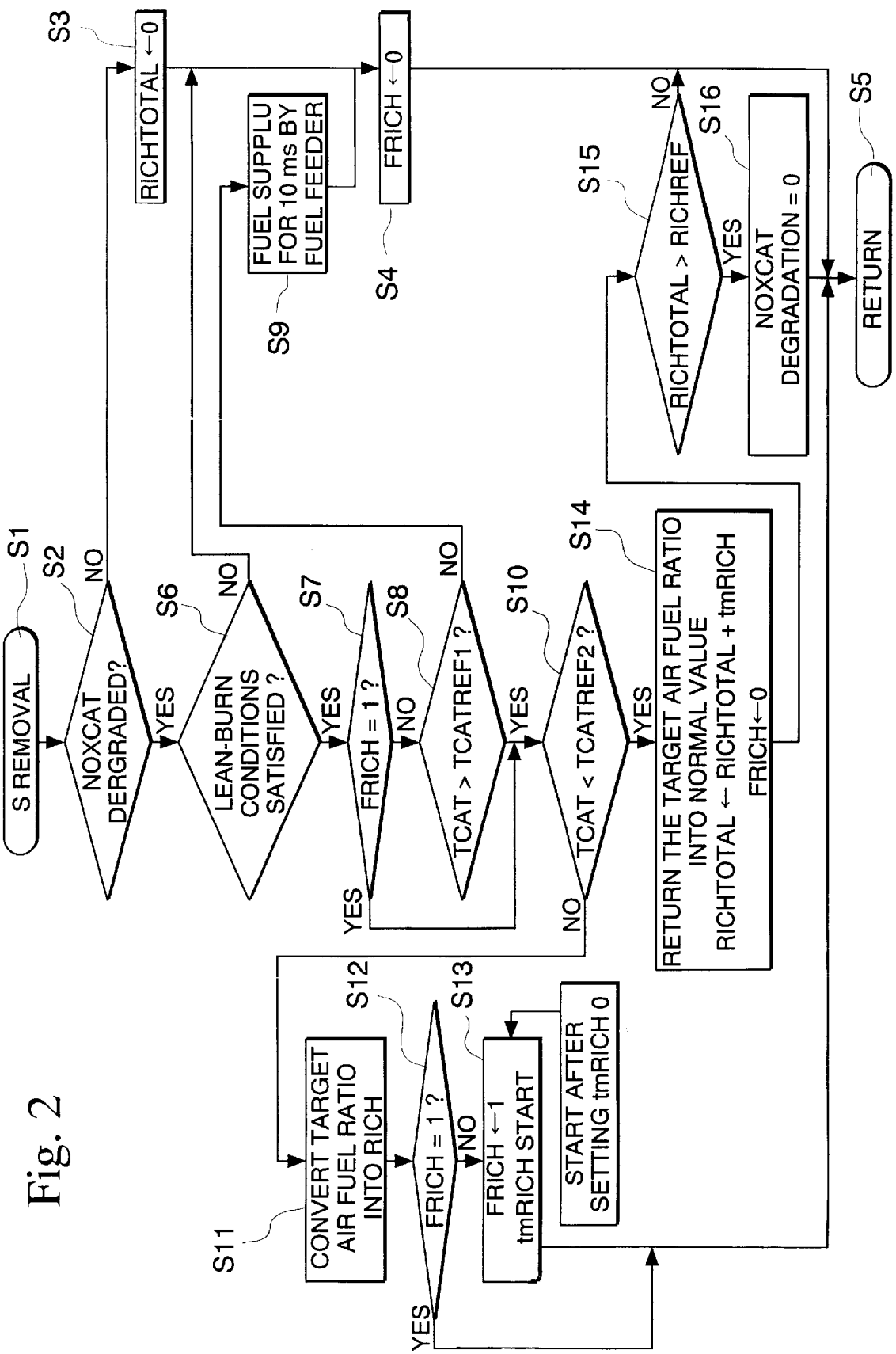
FIG. 2 is a flow chart showing an operation of the exhaust purification of the internal combustion engine illustrated in FIG. 1.

The exhaust purifying apparatus of the internal combustion engine 11 according to the present embodiment has the structure shown above. Hereinafter, the operation of the exhaust purifying apparatus 10 of the internal combustion engine will be described with reference to FIGS. 1 to 3. FIG. 2 is a flow chart showing the operation of the exhaust purifying apparatus 10 of the internal combustion engine 11 shown in FIG. 1, and FIG. 3 is a timing chart showing the operation of the exhaust purifying apparatus 10 of the internal combustion engine shown in FIG. 1.

When the air-fuel ratio of a mixture to be supplied to the internal combustion engine 11 is made leaner than the stoichiometric air-fuel ratio for driving under a lean-burn control, the NOx absorbent absorbs and accumulates sulfur compounds such as SOx in addition to NOx in the exhaust gas. In proportion to the increase of the accumulated amount of the sulfur compounds, the efficiency of purifying the exhaust gas of NOx is reduced, that is, the amount of NOx absorbed by the NOx absorbent decreases.

Here, the ECU 15 starts a series of processes to restore the degraded NOx absorbent 26 by removing sulfur compounds from the NOx absorbent in synchronism with the generation of the TDC pulse signal output from the NE sensor 20 (step S1).

First, the ECU 15 evaluates the amount of sulfur compounds accumulated in the NOx absorbent based on the driving time by the lean-burn control and the electric signals from, for example, the first and the second $O_2$ sensors, and then judges whether the evaluated amount exceeds the predetermined amount (step S2). That is, as shown in FIG. 2, if the evaluated amount of the sulfur compounds absorbed in the NOx absorbent exceeds a predetermined amount, the flag indicating the judgement of the degradation of the NOx absorbent is set to "1". In contrast, if the amount of sulfur compounds in the NOx absorbent is below the predetermined amount, the degradation of NOx absorbent NOXCAT is set to "0", and at step S2, a judgement is made whether or not NOXCAT is "1".

When the result of the judgement is "NO", which means that the NOx absorbent 26 is not degraded or has already been restored, the target air-fuel ratio (KCMD), which will be described in detail later, is made richer than the stoichiometric air-fuel ratio, and, the total time (RICHTOTAL) during which the fuel injection valve 16 is controlled, is reset to "0" (step S3). In addition, the flag (FRICH) which indicates whether or not the KCMD is made rich is set to "0" and the routine is completed (step S5).

When the result of the judgement at step S2 is "YES", that is, the NOx absorbent is degraded, a judgement is carried out as to whether practicable conditions for executing the lean-burn control has been realized (step S6). Here, the practicable conditions for executing the lean-burn control mean, for example, a driving condition for an internal combustion engine to implement the feedback control in accordance with the measured value of the LAF sensor 24 such that the target air-fuel ratio (KCMD) set for the air-fuel ratio of the mixture is below a predetermined value leaner than the stoichiometric air-fuel ratio. The target air-fuel ratio (KCMD) used for controlling, for example, the fuel injection valve 16 is proportional to the fuel air ratio (F/A) which is a reciprocal of the air-fuel ratio (A/F), and the value corresponding to the stoichiometric air-fuel ratio is 1.0. This KCMD is established in accordance with the driving parameters of the internal combustion engine 11 based on measured values of the PBA sensor 17, TW sensor, and NE sensor 20.

When the result of the judgement at step S6 is "NO", the steps after step S4 in the program are executed. If the result is "YES", a judgement is made as to whether the FRICH is "1", that is, whether KCMD is made richer than the stoichiometric air-fuel ratio (step S7).

When the result of the above judgement is "YES", the processing below step S10 described later is executed. In contrast, when the result is "NO", that is, when KCMD set for the fuel injection valve is made leaner than the value corresponding to the stoichiometric air-fuel ratio, like the state, for example, before t2 in FIG. 3, a further judgement is made as to whether or not the temperature of the catalyst (TCAT) of the NOx absorbent 26 exceeds a predetermined temperature (TCATREF1), for example, 650° C.

If the result of the above judgement is "YES", the steps after step S10 described later are executed. In contrast, if the result is "NO", and if the condition is before t1 in FIG. 3, the fuel is supplied into the exhaust pipe 22 for a predetermined time, for example, for 10 ms, by controlling the fuel feeder 29 (step S9). Thereby, as shown by the period from t1 to t2 in FIG. 3, the fuel supplied from the fuel feeder 29 burns in the NOx absorbent and raise the TCAT for decomposing the sulfur compounds absorbed in the NOx absorbent to convert them into $SO_3^-$ or $SO_4^-$. In addition, the following steps after step S4 are executed.

In step S10, when TCAT exceeds a predetermined upper limit temperature (TCATREF1) of the NOx catalyst 26, as seen near t2 in FIG. 3, or when TCAT falls below a predetermined lower limit temperature (TCATREF2), such as 600° C., as seen near t3 in FIG. 3, a switching operation for switching KCMD established for controlling the fuel injection valve 16 is carried out from lean to rich, or from rich to lean.

Here, a judgement is made whether or not the TCAT is lower than TCATREF2. When the result is "NO", there are two states depending on the judgement conditions of steps S7 and S8.

One state is represented by, for example, the state before t2 near t2, wherein KCMD for the fuel injection valve 16 is made lean, FRICH is set to "0", and TCAT of the NOx absorbent 26 rises and exceeds TCATREF1 due to the fuel supply into the exhaust pipe 22 by means of the fuel feeder 29.

The other state is represented by, for example, the state in which the TCAT is decreasing from a point higher than TCATREF2, as seen between t2 and t3, wherein the fuel supply into the exhaust pipe 22 by the fuel injection valve 16 is suspended, and the exothermic reaction in the NOx absorbent 26 is suppressed by setting FRICH to "1", thus the amount of oxygen in the exhaust gas flown into the NOx absorbent 26 is reduced, and TCAT gradually decreases. In the region between t2 and t3, sulfate ions such as $SO_3^-$ or $SO_4^-$ formed in the NOx absorbent is gradually released as, for example, SOx from the NOx absorbent by being reduced by non-burned hydrocarbons or carbon monoxide.

As shown above, if the result of the judgement in step S10 is "NO", KCMD being used for controlling the fuel injection valve 16 is made leaner than the stoichiometric air-fuel ratio (step S11). In addition, a judgement is made whether FRICH is set to "1"(step S12), and if the result is "YES", the series of processes ends (step S5). In contrast, if the result of the above judgement is "NO", FRICH is set to "1", a counting operation by the timer is started again after resetting the clock (tmRICH) in which KCMD is set on a richer side, and the process ends (step S5).

A region where the result of the judgement at step S10 is "YES" is near t3 and before t3, wherein the fuel supply into the exhaust pipe 22 by the fuel feeder 29 is suspended, KCMD for the fuel injection valve is made leaner, and FRICH is set to "1", so that the CAT of the NOx absorbent 26 is reduced below TCATREF2. In this case, KCMD for the fuel injection valve 16 is made leaner than the reference value, that is, the stoichiometric air-fuel ratio, and FRICH is set to "0". Furthermore, a time increment tmRICH is added to the duration time, that is, the total time (RICHTOTAL) during which KCMD for the fuel injection valve is made richer (step S14).

Next, judgement is made as to whether RICHTOTAL exceeds a predetermined time (RICHREF)(step S15). If the result is "YES", it is judged that the degraded NOx absorbent is restored and after setting the NOXCAT degradation to "0", the routine is completed (step S5).

In contrast, if the result is "NO" and it is judged that the degradation of the NOx absorbent is not corrected, the routine is completed (step S5). Furthermore, as in the case after t3, the above-described consecutive processing is repeatedly executed until the degraded NOx absorbent is corrected in synchronism with generation of a new TDC pulse signal.

The exhaust purifying apparatus according to one embodiment of the present invention is capable of burning fuel for raising the temperature of the NOx absorbent 26 by supplying fuel into the exhaust pipe 22 by means of the fuel feeder 29 provided upstream of the NOx absorbent 26, when raising the temperature of the degraded NOx absorbent 26. Such a method of heating the NOx absorbent 26 is more advantageous than the method of heating the exhaust gas by changing rotation of the internal combustion engine to a low speed in that the engine speed does not change so that it is possible to prevent degrading the fuel consumption.

When the temperature of the NOx absorbent (TCAT) exceeds a predetermined upper limit (TCATREF1), it is possible to chemically reduce and purify the exhaust gas of the sulfur compounds absorbed in the NOx absorbent 26 and to restore the degraded NOx absorbent by increasing amount of non-burned hydrocarbons and carbon monoxide in the exhaust gas by converting the air-fuel ratio into richer than the stoichiometric air-fuel ratio by controlling the fuel injection valve 16 provided upstream of the internal combustion engine 11.

In the present embodiment, it is defined that the NOx absorbent 26 absorbs NOx in the exhaust gas, but the definition of absorption does not necessarily mean that the NOx is absorbed (and further diffused) in the catalyst of the NOx absorbent after conversion into nitric ions such as $NO_3^-$ but also means that NOx is chemically adsorbed on the surface of the catalyst which forms the NOx absorbent.

Although it is indicated above that the present embodiment may provide a three way catalyst 23 in the exhaust pipe 22 for purifying gas components such as hydrocarbons, carbon monoxide and NOx, the present invention is not necessarily be limited to use in a three way catalyst, and the three way catalyst 23 may be omitted.

Furthermore, although it is also indicated above that the present embodiment may provide a first $O_2$ sensor and the second $O_2$ sensor upstream and downstream of the NOx absorbent, respectively, the present invention is not limited to the above structure and these $O_2$ sensors may be omitted. In such a case, the amount of sulfur component absorbed in the NOx absorbent can be estimated from, for example, the duration of the lean burn control or from the total amount of fuel supplied to the internal combustion engine.

The time for the fuel feeder 29 to execute the fuel injection operation into the exhaust system is limited to 10 ms in the present embodiment as shown above. However, this time is not particularly limited to the above value, but a suitable time may be set according to the driving conditions of the internal combustion engine.

Although the CAT temperature sensor is provided for measurement of the catalyst of the NOx absorbent, the present invention is not limited to this structure, and the CAT temperature sensor may be omitted. In such a case, the temperature of the catalyst TCAT may be estimated from, for example, the total amount of the fuel supplied by the fuel feeder 29 to the exhaust pipe 22, or from the total time during which the fuel injection valve 16 controls the target air-fuel ratio coefficient (KCMD) to be richer or leaner than the stoichiometric air-fuel ratio.

In addition, when the temperature of the NOx absorbent exceeds a predetermined upper limit, the NOx absorbent may be restored by making the air-fuel ratio richer than the stoichiometric air-fuel ratio by controlling the fuel injection valve 16 and also supplying the fuel from the fuel feeder 29.

As explained above, the exhaust purifying apparatus of the present invention exhibits the following effects. That is, when it is necessary to raise the temperature of the degraded NOx absorbent, heating can be attained simply in the present invention by supplying the fuel to the exhaust pipe from the fuel feeder provided upstream of the nitrogen oxides absorbent, in contrast to the conventional heating method which changes the rotation speed of the internal combustion engine, so that the present apparatus is capable of maintaining a good operational status and preventing the fuel consumption from being degraded by changing the gear position to a low speed.

In addition, since the present apparatus does not require any auxiliary heating devices such as heaters or burners for heating, for example, the nitrogen oxides absorbent, the present apparatus can be simple and can reduce the manufacturing cost.

What is claimed is:

1. An exhaust purifying apparatus, provided in an exhaust system of an internal combustion engine and provided with a nitrogen oxide absorbent, which absorbs nitrogen oxide when an air-fuel ratio of an exhaust gas is leaner than a stoichiometric air-fuel ratio, and reduces nitrogen oxide when the air-fuel ratio of the exhaust gas is richer than the stoichiometric air-fuel ratio, comprising:

an air-fuel ratio controlling device for controlling the air-fuel ratio of a mixture supplied to the engine, and a fuel feeder for feeding fuel upstream of said nitrogen oxide absorbent;

a temperature raising device for raising the temperature of said nitrogen oxide absorbent by controlling the air-fuel ratio of the mixture so as to become leaner than the stoichiometric air-fuel ratio of the air-fuel ratio controlling device and feeding fuel means of said fuel feeder, when an absorbing capability of said nitrogen oxide absorbent is catalyst poisoned by accumulated sulfur compounds; and a restoring device for restoring the nitrogen oxide absorbing capability of said nitrogen oxide absorbent by controlling the air-fuel ratio of the mixture so as to become richer than the stoichiometric air-fuel ratio of said air-fuel ratio controlling device after the temperature of the nitrogen oxides absorbent is raised by said temperature raising device;

wherein the temperature of said nitrogen oxide absorbent is raised by the temperature raising device when the temperature of said nitrogen oxide absorbent drops below a predetermined temperature while restoring the nitrogen oxide by the restoring device.

2. An exhaust purifying apparatus as set forth in claim 1, further comprising:

a time counting device for counting time when said nitrogen oxide absorbent is restored by the restoring device, wherein restoring of the nitrogen oxide by the restoring device is completed when the counting time reaches a predetermined time.

* * * * *